US009169965B2

(12) United States Patent
Hardikar et al.

(10) Patent No.: US 9,169,965 B2
(45) Date of Patent: Oct. 27, 2015

(54) GEOMETRIC AND MATERIAL HYBRID SYSTEMS FOR TRAY TABLE ARM

(71) Applicant: SABIC Innovative Plastics IP B.V., Bergen op Zoom (NL)

(72) Inventors: Narendra Anand Hardikar, Bangalore (IN); Anil Tiwari, Bilaspur (IN); Harindranath K. Sharma, Bangalore (IN); Jamie Tebay, Kennett Square, PA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 51 days.

(21) Appl. No.: 13/770,518

(22) Filed: Feb. 19, 2013

(65) Prior Publication Data

US 2014/0230700 A1   Aug. 21, 2014

(51) Int. Cl.
*A47B 37/00* (2006.01)
*F16M 13/02* (2006.01)
*A47B 5/00* (2006.01)
*B29C 45/72* (2006.01)
*B60N 3/00* (2006.01)
*B64D 11/06* (2006.01)

(52) U.S. Cl.
CPC ............... *F16M 13/02* (2013.01); *A47B 5/006* (2013.01); *B29C 45/72* (2013.01); *B60N 3/004* (2013.01); *B64D 11/0638* (2014.12)

(58) Field of Classification Search
CPC ........ B60N 3/001; B60N 3/002; B60N 3/004; B64D 2011/0679; A47B 31/06; A47B 5/006; Y10S 248/903

USPC ........ 297/146, 163–169; 108/42, 44; 248/903
See application file for complete search history.

(56) References Cited

U.S. PATENT DOCUMENTS

| | | | |
|---|---|---|---|
| 3,773,381 A | 11/1973 | Brennan | |
| 4,281,874 A * | 8/1981 | Iwans et al. | 297/163 |
| 4,364,604 A * | 12/1982 | Brunelle | 297/163 |
| 4,511,178 A * | 4/1985 | Brennan | 297/146 |
| 5,131,265 A | 7/1992 | Tobin et al. | |
| 5,169,209 A * | 12/1992 | Beroth | 297/146 |
| 5,706,737 A * | 1/1998 | Whitehead et al. | 108/42 |
| 5,979,336 A * | 11/1999 | Nottingham et al. | 108/42 |
| 6,220,658 B1 | 4/2001 | Lukawski et al. | |
| 6,257,531 B1 * | 7/2001 | Penner | 248/118 |
| 6,260,917 B1 * | 7/2001 | Marechal | 297/163 |
| 6,454,349 B1 | 9/2002 | Konya | |
| 6,916,068 B2 * | 7/2005 | Kitamura et al. | 297/411.3 |
| 7,004,430 B2 * | 2/2006 | Weekly | 244/129.1 |
| 7,287,817 B2 | 10/2007 | Goldman | |
| 7,784,862 B2 | 8/2010 | Pozzi et al. | |
| 8,251,543 B2 * | 8/2012 | Bauer | 362/249.11 |

(Continued)

OTHER PUBLICATIONS

Moniruzzaman; "Aircraft Weight Reduction through Materials Innovation: Design and Performance Study of Metal Replacement with LNP* Thermocomp* Compounds in Aircraft Food Tray Arms"; Sep. 2011; 13 Pages.

(Continued)

*Primary Examiner* — Hanh V Tran
(74) *Attorney, Agent, or Firm* — Cantor Colburn LLP

(57) ABSTRACT

In an embodiment, a support arm includes: a thermoplastic material and a filler. A cross-section of the support arm taken along a line from an inner edge to an outer edge of the support arm comprises a modified I-shaped, a I/U-shaped, or a U-shaped cross-section.

24 Claims, 10 Drawing Sheets

(56) References Cited

U.S. PATENT DOCUMENTS

| | | |
|---|---|---|
| 8,347,791 B1 * | 1/2013 | Gray et al. .................. 108/42 |
| 2003/0094843 A1 * | 5/2003 | Jensen et al. ................ 297/391 |
| 2003/0227208 A1 * | 12/2003 | Burwell et al. ............ 297/411.2 |
| 2005/0218290 A1 * | 10/2005 | Muramatsu .................. 248/674 |
| 2007/0283855 A1 * | 12/2007 | Pozzi ......................... 108/44 |
| 2009/0174234 A1 * | 7/2009 | Vignal et al. ................ 297/163 |
| 2009/0309407 A1 * | 12/2009 | Saito et al. ............... 297/411.32 |
| 2010/0224102 A1 | 9/2010 | Allgood |
| 2011/0187163 A1 * | 8/2011 | Westerink et al. ............ 297/163 |
| 2011/0204683 A1 * | 8/2011 | Roy et al. .................... 297/163 |
| 2012/0091764 A1 * | 4/2012 | Cailleteau et al. ............ 297/162 |
| 2012/0255258 A1 | 10/2012 | Guillemaut |
| 2013/0001987 A1 * | 1/2013 | Heredia ....................... 297/163 |

OTHER PUBLICATIONS

Moore; "Carbon Fiber Teams Up with PEI in Tray Table Arms"; Plastics Today; Jun. 4, 2010; 3 Pages.

International Search Report for International Application No. PCT/US2014/015323; International Filing Date: Feb. 7, 2014; Date of Mailing: Jul. 28, 2014; 4 pages.

Written Opinion of the International Search Report for International Application No. PCT/US2014/015323; International Filing Date: Feb. 7, 2014; Date of Mailing: Jul. 28, 2014; 7 pages.

* cited by examiner

GEOMETRIC AND MATERIAL HYBRID SYSTEMS FOR TRAY TABLE ARM

BACKGROUND

Tray table arms are employed across the transportation segment in transportation vessels such as airplanes, trains, helicopters, and buses. For example, airplanes are equipped with tray tables for use by passengers during flight. Tray tables are typically stowed in the seatback of most passenger seats in a non-operative position and are lowered into an operative position during flight. Tray tables are customarily connected to a set of support arms (also referred to as tray table arms) which pivot downwardly from the seatback immediately forward of the passenger to the operative position. The support arms are commonly attached to the sides of the seat frame so as not to interfere with the living space of either passenger, and to support the tray table about each of its ends. Likewise, the tray table can be supported by a single support arm.

Tray table arms are generally made from isotropic metals such as aluminum due to their excellent isotropic mechanical properties as well as due to their lower weights as compared to metals such as steel. FIG. 1 illustrates a typical metal support arm 1. Such metal support arms are formed with uniform open sections that are C-shaped, where an exemplary C-shaped cross-section 10 taken along line A-A of FIG. 1 is illustrated in FIG. 2. The C-shaped cross-section is used in part due to the simplicity of the design in manufacturing and has the further benefit of acting as a shield to the moving stopper pin that is used for fine tuning the position of the table from the external interference, debris accumulation, and intentional abuse.

Weight reduction in aerospace components offers significant benefits in terms of cost reduction arising from fuel savings or more mileage from the same level of fuel. There accordingly remains a need in the art for a lighter weight support arm that does not experience premature failure.

SUMMARY

Disclosed herein are tray table arms, articles comprising the same, and methods of making the same.

In an embodiment, a support arm comprises: a thermoplastic material; and a filler. A cross-section of the support arm taken along a line from an inner edge to an outer edge of the support arm comprises a modified I-shaped, a I/U-shaped, or a U-shaped cross-section.

In an embodiment, a method of preparing a support arm comprises: rapidly heating a mold to a glass transition temperature of a thermoplastic material; injecting a thermoplastic material comprising a filler into the mold and allowing the thermoplastic material to conform to the mold; rapidly cooling the mold to an ejection temperature to form the tray table arm; and ejecting the support arm. A cross-section of the support arm taken along a line from an inner edge to an outer edge of the support arm is a modified I-shaped, a I/U-shaped, or a U-shaped cross-section.

In an embodiment, a tray table comprises: a support arm comprising a thermoplastic material and a filler, a torque rod; a pivot block; a stopper pin; a table; and a means for keeping the tray table in the operable position. A cross-section of the support arm taken along a line from an inner edge to an outer edge of the support arm comprises a modified I-shaped, a I/U-shaped, or a U-shaped cross-section.

BRIEF DESCRIPTION OF THE DRAWINGS

Refer now to the figures, which are exemplary embodiments, and wherein the like elements are numbered alike

DETAILED DESCRIPTION

Figure 3:
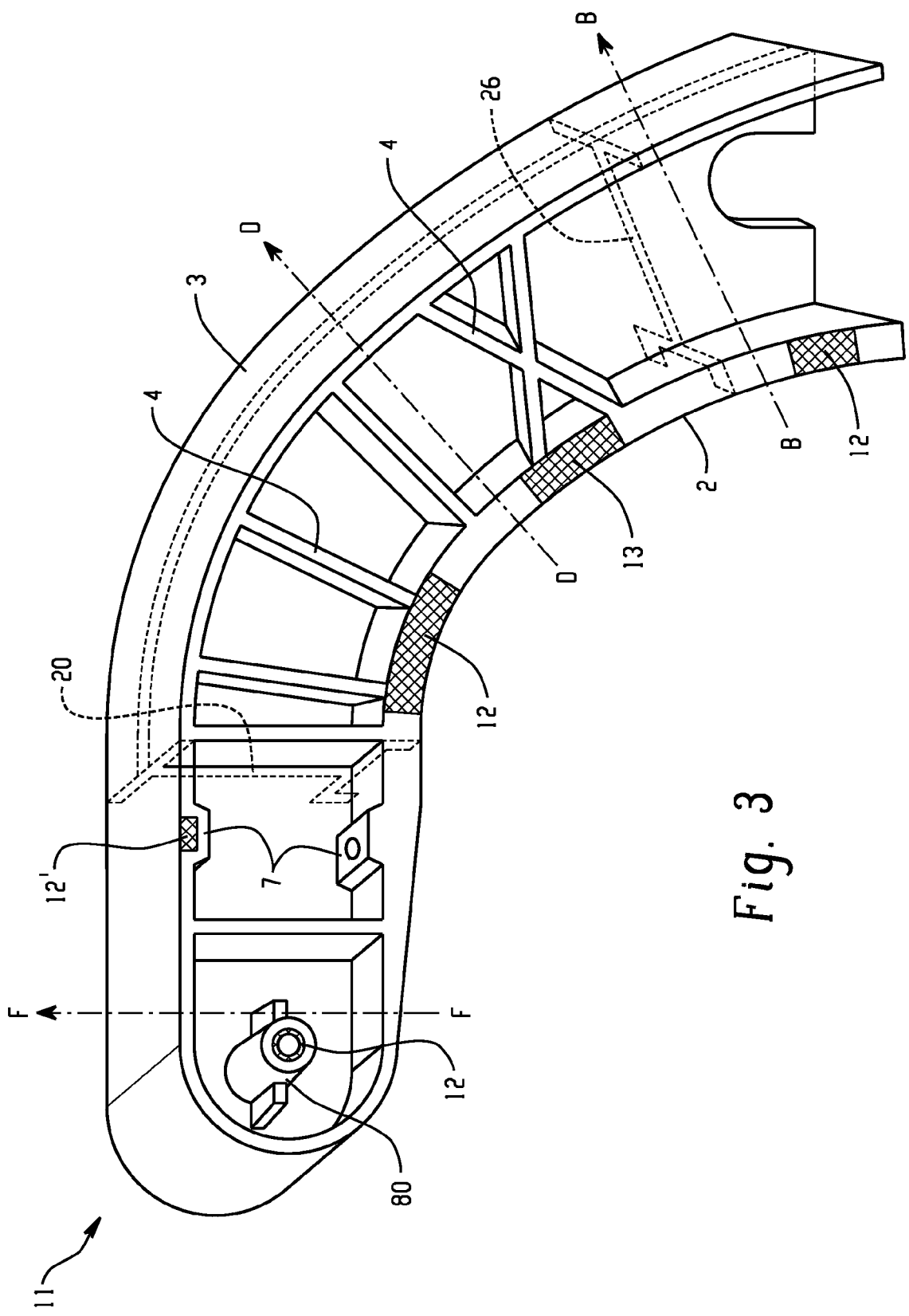
FIG. 3 is an illustration of a support arm.

Support arms for tray tables on airplanes are typically made of aluminum due to its excellent mechanical properties. Attempts to reduce the weight of tray table support arms in order to achieve a cost reduction arising from fuel savings has resulted in attempts to utilize lighter weight thermoplastic materials in place of the aluminum. Towards this, there have been attempts to replace aerospace grade aluminum with lighter thermoplastic materials. However, there have been problems with respect to the structural integrity and premature failure of such thermoplastic support arms, where premature failure frequently occurs in regions of high stress that the thermoplastic material cannot accommodate. Such high stress regions 12 are illustrated in FIG. 3, where the high stress region 12' can be further exacerbated by the presence of a threaded screw that can be present to hold the position of the tray table in the operable position.

The support arm can comprise a polymer such as a thermoplastic material, or a combination of thermoplastic and thermoset materials. The thermoplastic material can comprise a polycarbonate, a polyester (such as poly(ethylene terephthalate), poly(butylene terephthalate), and poly(lactic acid)), a polyamide (such as aliphatic polyamides including nylon 6, semi-aromatic polyphthalamides, and aromatic polyamides), a polyimide (such as polyetherimide), a polyketone (such as poly(ether ether ketone) (PEEK), poly(ether ketone), and poly(aryl ether ketone)), a polysulfide (such as poly(phenylene sulfide)), a polysulfone (such as poly(ether sulfone)), a polyacrylate (such as poly(methyl methacrylate)), a polyacetal (such as poly(oxymethylene)), a polyacetate (such as poly(vinyl acetate)), a fluoro plastic (such as polytetrafluoroethylene), a chloro plastic (such as poly(vinyl chloride) and poly(vinylidene chloride)), a polyethylene (such as high density polyethylene, low density polyethylene, and ultra high molecular weight polyethylene), a polyurethane, polypropylene, an acrylonitrile butadiene styrene copolymer, a styrene acrylonitrile copolymer, polyphenylene, polyvinyl alcohol, polystyrene, polycaprolactone, polybutylene, polybutadiene, a copolymer comprising at least one or more of the foregoing or a blend comprising at least one or more of the foregoing. For example, the thermoplastic material can comprise a polycarbonate/ABS blend (CYCOLOY™ resins commercially available from SABIC's Innovative Plastics business), a copolycarbonate-polyester, acrylic-styrene-acrylonitrile (ASA) (GELOY™ resins commercially available from SABIC's Innovative Plastics business), a blend of polyphenylene ether/polyamide (NORYL GTX™ resins from SABIC's Innovative Plastics business), a blend of polycarbonate/polyethylene terephthalate (PET)/polybutylene terephthalate (PBT), polybutylene terephthalate and impact modifier (XENOY™ resins commercially available from SABIC's Innovative Plastics business), polycarbonate (LEXAN™ and LEXAN™ EXL resins commercially available from SABIC's Innovative Plastics business), poly (methyl)meth acrylate (PMMA) capped polycarbonate, polyetherimide (ULTEM™ polyetherimide resin (e.g., EC006PXQ™ and/or EC008PXQ™) or SILTEM™, both commercially available SABIC's Innovative Plastics business).

The support arm can comprise a flame retardant additive, such as SILTEM™, both commercially available from SABIC's Innovative Plastics business.

The support arm can comprise a filler. Non-limiting examples of fillers include silica powder, such as fused silica, crystalline silica, natural silica sand, and various silane-coated silicas; boron-nitride powder and boron-silicate powders; alumina and magnesium oxide (or magnesia); wollastonite including surface-treated wollastonite; calcium sulfate (as, for example, its anhydride, dihydrate or trihydrate); calcium carbonates including chalk, limestone, marble and synthetic, precipitated calcium carbonates, generally in the form of a ground particulate which often comprises 98+% $CaCO_3$ with the remainder being other inorganics such as magnesium carbonate, iron oxide and alumino-silicates; surface-treated calcium carbonates; talc, including fibrous, modular, needle shaped, and lamellar talcs; glass spheres, both hollow and solid, and surface-treated glass spheres typically having coupling agents such as silane coupling agents and/or containing a conductive coating; kaolin, including hard, soft, calcined kaolin, and kaolin comprising various coatings known in the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; fillite; aluminosilicate (armospheres), including silanized and metallized aluminosilicate; quartz; quartzite; perlite; tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; particulate or fibrous aluminum, bronze, zinc, copper and nickel; carbon black, including conductive carbon black; and graphite, such as graphite powder.

The filler can comprise a filler having an aspect ratio greater than 1. Such fillers can exist in the form of flakes, whiskers, fibers, needles, rods, tubes, strands, elongated platelets, lamellar platelets, ellipsoids, micro fibers, nanofibers, nanotubes, elongated fullerenes, and the like. Where such fillers exist in aggregate form, an aggregate having an aspect ratio greater than 1 will also suffice. Examples of such fillers well known in the art include those described in "Plastic Additives Handbook, 5th Edition" Hans Zweifel, Ed, Carl Hanser Verlag Publishers, Munich, 2001

Non-limiting examples of flakes having an aspect ratio greater than 1 include glass flakes, flaked silicon carbide, aluminum diboride, aluminum flakes, and steel flakes. Non-limiting examples of fibrous fillers include processed mineral fibers such as those derived from blends comprising at least one of aluminum silicates, aluminum oxides, magnesium oxides, calcium sulfate hemihydrate, boron fibers, ceramic fibers such as silicon carbide, and fibers from mixed oxides of aluminum, boron, and silicon sold under the trade name NEXTEL™ by 3M Co., St. Paul, Minn., USA; and natural fibers including wood flour, cellulose, cotton, sisal, jute, starch, cork flour, lignin, ground nut shells, corn, rice grain husks, cloth, hemp cloth, felt, and natural cellulosic fabrics such as Kraft paper, cotton paper, and glass fiber containing paper. Synthetic reinforcing fibers can be used provided the glass transition temperature of the synthetic fiber is greater than that of the thermoplastic material. Suitable synthetic fibers include polyester fibers such as poly(ethylene terephthalate) and poly(butylene terephthalate), poly(vinyl alcohol) fibers, polyarylates, polyethylene, aromatic polyamide fibers, polybenzimidazole fibers, poly(phenylene sulfide) fibers, poly(ether ether ketone) fibers, polytetrafluoroethylene fibers, acrylic resin fibers, high tenacity fibers with high thermal stability including aromatic polyamides, polyaramid fibers such as Kevlar (product of Du Pont), polyimide fibers such as polyimide 2080 and PBZ fiber (both products of Dow Chemical Company) and polyetherimide fibers; poly(ether ether ketone) fibers, polybenzoxazole fibers, and the like. Fibrous fillers such as basalt fibers, including textile glass fibers and quartz are also considered.

The filler can comprise glass fibers. Useful glass fibers can be formed from any type of fiberizable glass composition known to those skilled in the art, and include those prepared from fiberizable glass compositions commonly known as "E-glass," "A-glass," "C-glass," "D-glass," "R-glass," "S-glass," as well as E-glass derivatives that are fluorine-free and/or boron-free. Such compositions and methods of making glass filaments therefrom are well known to those skilled in the art and a more detailed description is not necessary.

The filler can comprise a carbon fiber. The carbon fibers can have an average diameter of 3.5 nanometers to 5 micrometers, specifically 4 to 100 nanometers, more specifically 5 to 10 nanometers. The carbon fibers can be vapor-grown carbon fibers. The carbon fiber can comprise carbon nanotubes. The carbon nanotubes can have a length to diameter ratio of up to 132,000,000:1. The carbon nanotubes can comprise single walled nanotubes and/or multi-walled nanotubes.

The filler can be used with various coatings, including, for example, metallic coatings and silane coating.

In general the amount of optional fibrous filler present in the thermoplastic composition can be up to 70 weight percent (wt %) (e.g., greater than 0 to 70 wt %) based on the total weight of the composition, specifically 10 to 60 wt %, and more specifically, 20 to 50 wt % thereof.

The composition of the thermoplastic material and any optional filler can vary throughout the support arm, such that, for example, the modulus varies at different locations in the support arm. For example, the compressive modulus of the support arm at the inner edge 2 can be less than or equal to the tensile modulus of the support arm at the outer edge 3 (see FIGS. 3 and 13). Specifically, the support arm can have a Young's modulus of 4000 to 40,000 megapascal (MPa) that can be the same or vary with location in the support arm.

The support arm can have flame retardant properties such that it is compliant with the Federal Aviation Regulation (FAR). The support arm can meet one or more of the FAR requirements for low heat low smoke density, and low toxic combustion by-products. Specifically, the support arm can have one or more of a peak heat release of less than 65 $kW/m^2$, as measured by FAR 25.853 (OSU test); a total heat release at 2 minutes of less than or equal to 65 $kW*min/m^2$ as measured by FAR 25.853 (OSU test); and an NBS optical smoke density of less than 200 when measured at 4 minutes, based on ASTM E-662 (FAR/JAR 25.853).

Figure 2:
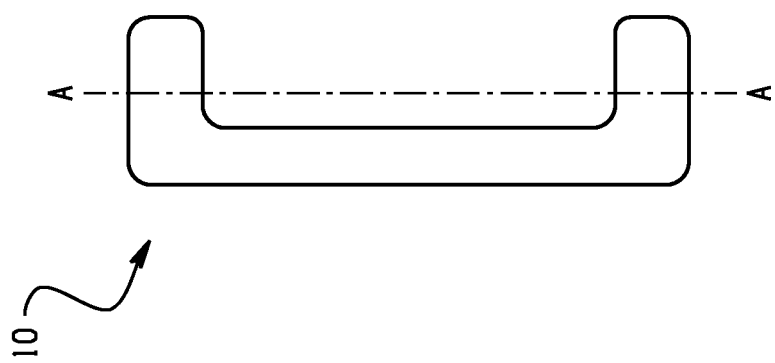
FIG. 2 is an illustration of a C-shaped cross-sectional area of a metal support arm.
Figure 1:
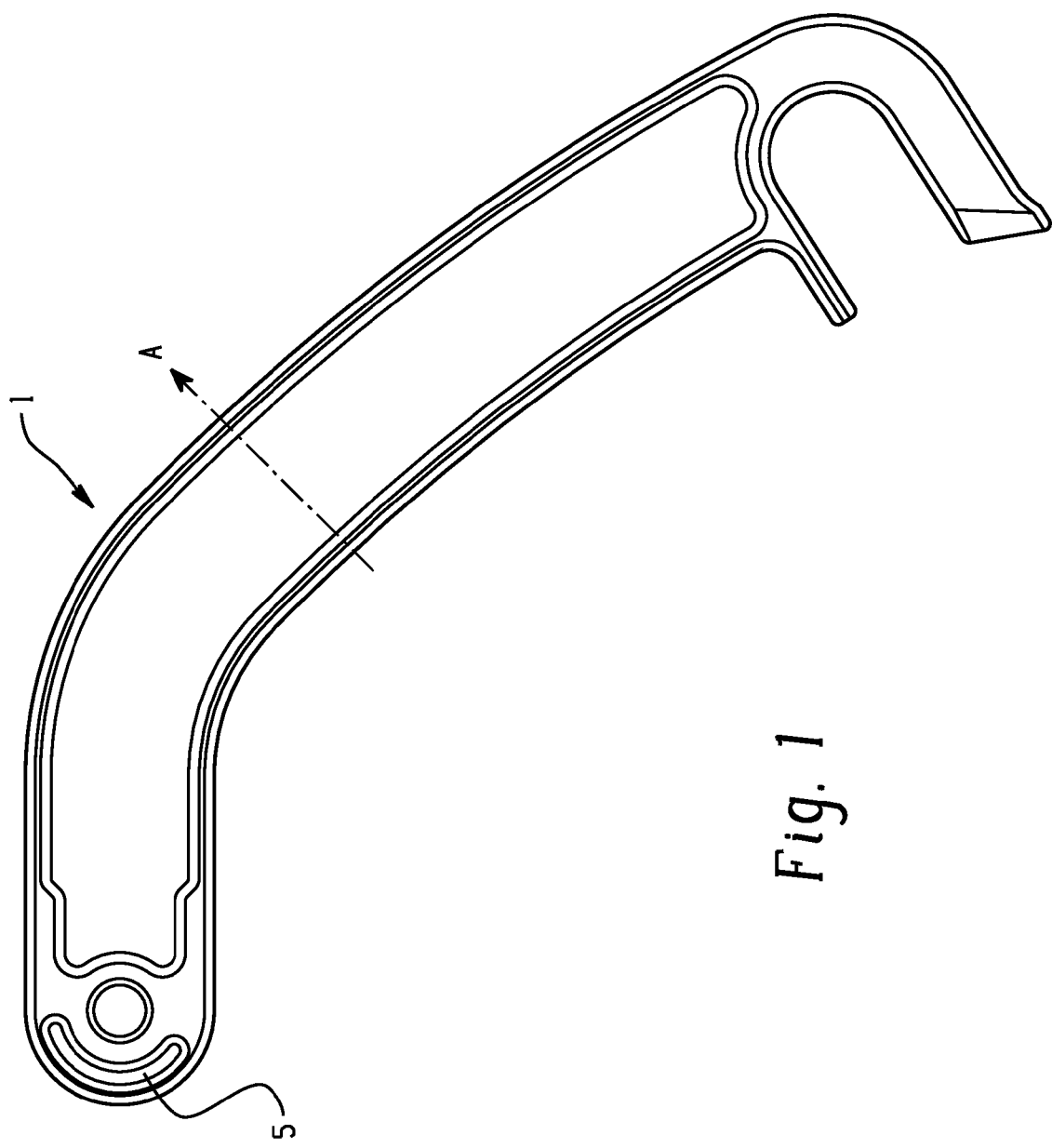
FIG. 1 is an illustration of a metal support arm.

As described above, metal tray table arms are generally made from isotropic metals such as aluminum due to their excellent mechanical properties under bending and torsional loads. As a result, polymers have not been considered since they are anisotropic. FIG. 1 illustrates a typical metal support arm 1 that comprises an inner edge 2, an outer edge 3, and transverse reinforcing ribs 4. When a cross-section is taken along a line from an inner edge 2 to an outer edge 3 of the support arm such as the line A-A of FIG. 1, one can see that the cross-section is a C-shaped cross-section 10, as is illustrated in FIG. 2.

Figure 4:
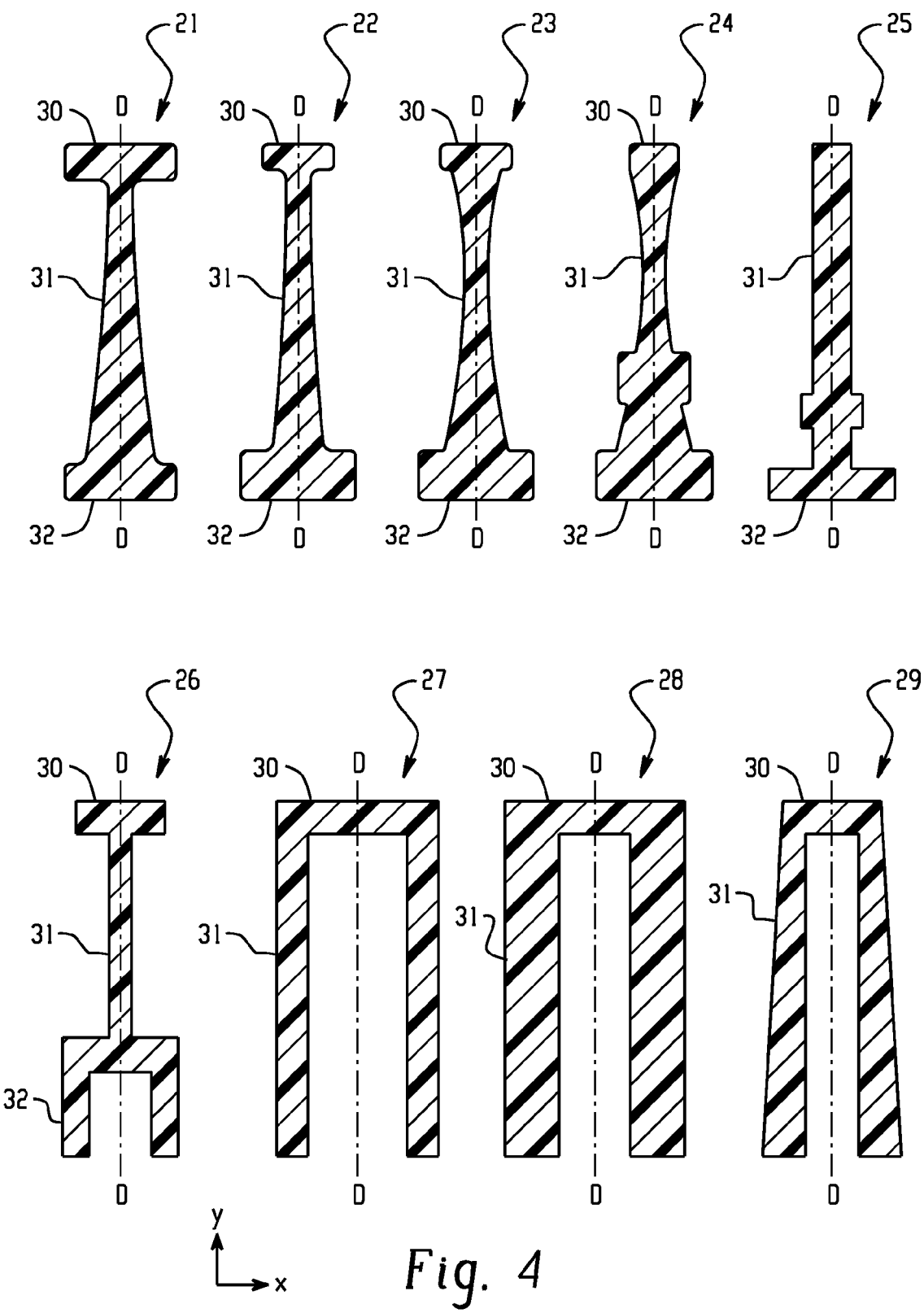
FIG. 4 is an illustration of various modified I-shaped, I/U-shaped, and U-shaped cross-sections.

The Applicants found that the C-shaped cross-section used in metal support arms is not an optimum cross-section for bi-modular support arms, as such materials have stiffness and strength values in compression that are lower than those when in tension. The Applicants found that by replacing at least a segment of the C-shaped cross-section with a modified I-shaped, a U-shaped, or a I/U-shaped cross-section resulted in thermoplastic support arms that were able to withstand the forces exerted on the support arm. The Applicants further found that a weight advantage could be derived from the replacement of the metal in a typical support arm with a thermoplastic material. FIG. 3 illustrates a schematic of the support arm 11. Similar to the metal support arm 1, the support arm 11 has an inner edge 2 and an outer edge 3, but unlike the metal support arm 1, the support arm 11 comprises at least one of a modified I-shaped, a U-shaped, or a I/U-shaped cross-section in addition to an optional C-shaped cross-section. For example, the support arm 11 can have a I/U-shaped cross-section taken along a line D-D of FIG. 3 from an inner edge 2 to an outer edge 3 of the support arm 11 as is illustrated as cross-section 26 in FIG. 4. FIG. 4 illustrates that the I/U-shaped cross-section 26 taken along the line D-D comprises an inner flange 32 along the inner edge 2, an outer flange 30 along the outer edge 3, and a web 31 there between. FIG. 4 illustrates examples of modified I-shaped, I/U-shaped, and U-shaped cross-sections as cross-sections 21-25, 26, and 27-29, respectively. One of ordinary skill in the art can readily envision other modified I-shaped, U-shaped, or I/U-shaped cross-sections besides those illustrated in FIG. 4.

Figure 7:
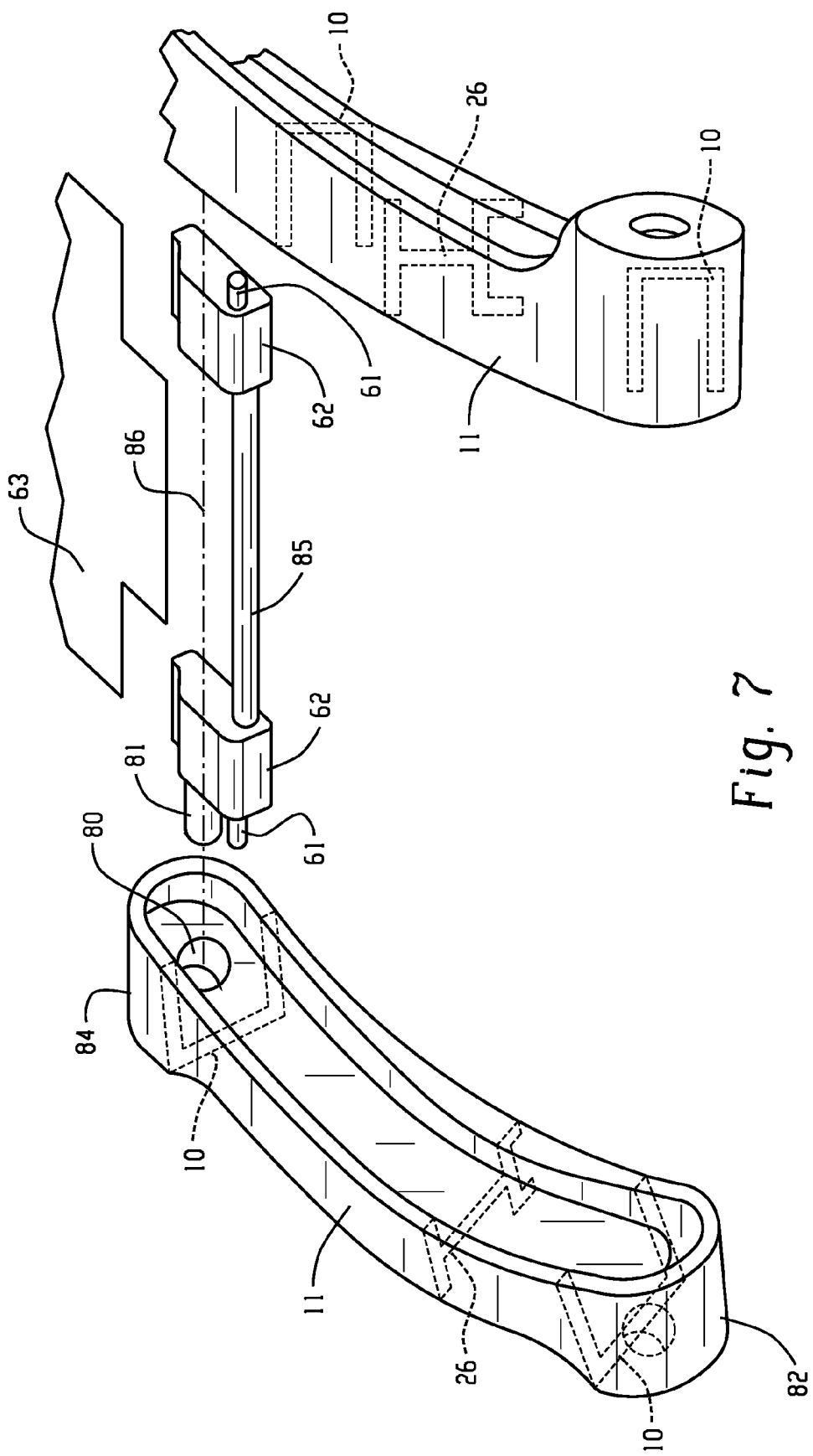
FIG. 7 is an illustration of a connection between support arms, a torque rod, and a table.

The shape of the cross-section can vary along the support arm 11, where, for example, considering FIG. 3, a cross-section along the line B-B can be different from that taken along the line D-D, which can be different from that taken along the line F-F. For example, FIG. 7 illustrates that the shape of the cross-section can vary along the support arm 11, where the support arms 11 have C-shaped cross-sections 10 at the first end 82 and the table end 84 and have a I/U-shaped cross-section 26 in the center region of the support arms.

Likewise, the dimensions including the height and/or width of the cross-sections, for example of the flanges and/or of the web, can vary at different locations along the support arm, where such variations can result in a variation in the distance between the inner edge and the outer edge along the support arm. For example, the distance between the inner edge 2 and the outer edge 3 as illustrated in FIG. 3 can be different when measured along lines B-B, D-D, and F-F.

Figure 5:
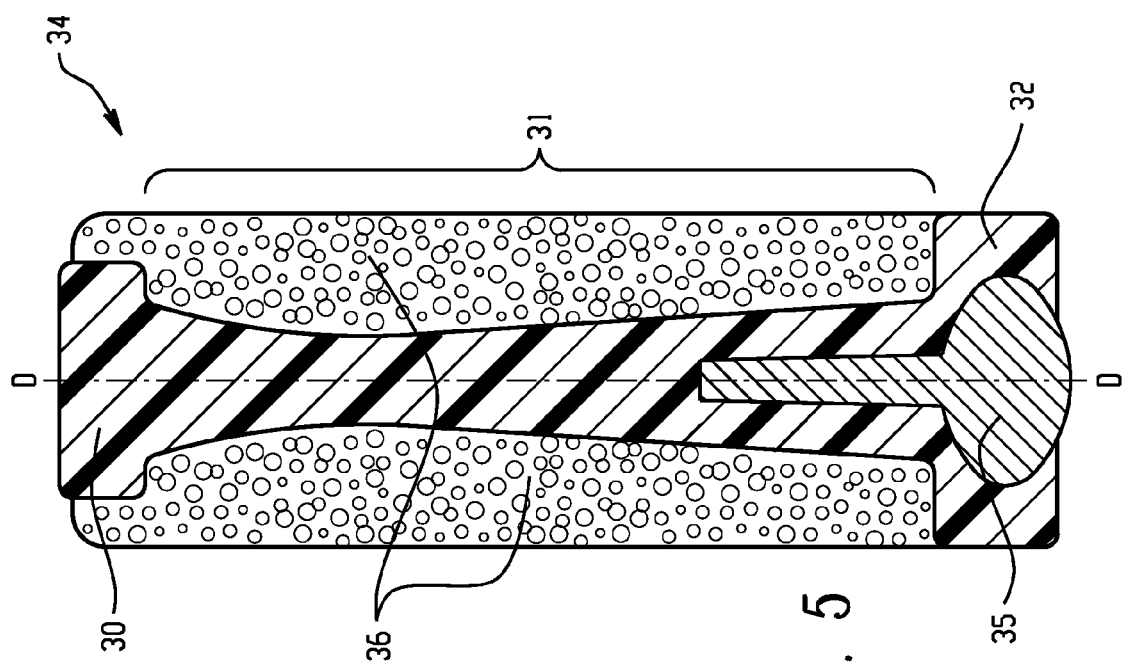
FIG. 5 is an illustration of an enhanced support arm with an insert and reinforcing regions.

The support arm can comprise an insert therein as is shown in FIG. 5, where FIG. 5 illustrates a cross-section of an enhanced arm 34 that comprises an insert 35 located in a cavity of the inner flange 32 and in the lower part of the web 31. The insert can be located in one or both of the inner flange and the web. The insert 35 can be any shape such that it fills at least a portion of a cavity in the support arm. The insert can be located along the entire inner edge 2 or can be localized to regions of, for example high and/or low stress such as the high stress regions 12 and the low stress region 13 as illustrated in FIG. 3. Specifically, the insert can be located in one or more of the area around the pin or the pivot, at a location where the tray table arm changes direction (i.e. where the tray table arm curves), in the region of a maximum bending moment, and along the length of or in the regions of high compressive stress along the inner edge 2.

The insert can comprise metal (such as aluminum, an aluminum alloy, and steel), a foam (such as a polyurethane foam, a polyimide foam such as a polyetherimide foam for example ULTEM™ resin, a polystyrene foam such as STYROFOAM™, a silicone foam, or a polyvinyl chloride foam), a thermoplastic resin different from that of the support arm, or the insert can be a void space. The insert can comprise the same material throughout the support arm or can be made of different materials at different locations. For example, the insert can comprise a higher modulus material than that of the thermoplastic material of the support arm in the high stress regions (such as aluminum or a highly filled thermoplastic material) and can comprise a lower modulus material than that of the thermoplastic material of the support arm in the low stress regions (such as a polyetherimide foam or simply a void space) to reduce the weight of said support arm.

The support arm can comprise reinforcing ribs. The reinforcing ribs can be configured similar to the transverse reinforcing ribs 4 as illustrated in FIG. 3, where they can be positioned diagonal to or perpendicular to the inner and outer edges 2 and 3. The reinforcing ribs can be parallel to the inner and outer edges 2 and 3, where cross-section 24 and 25 in FIG. 4 illustrate examples of modified I cross-sections that would result in such reinforcing ribs. The support arm can comprise 1 or more ribs 15, specifically 1 to 10, more specifically 1 to 5.

The reinforcing ribs can be on one or both sides of the support arm, for example, they can be on one or both sides of the web 31 of FIG. 4 and can be located in between the two web pieces of the U-shaped cross-section. The reinforcing ribs can be located across the entire span of the support arm or can be located in one or more locations on the arm, for example along a center portion.

The support arm can be formed via injection molding, such as 1-shot or 2-shot injection molding, using heat and cool technology, where a mold is rapidly heated and kept at that elevated temperature during the injection and packing phase of the thermoplastic material and subsequently cooled to the required mold temperature. This process is beneficial as it surprisingly allows for the reduction, even by as much as by a fraction of a millimeter in arm thickness, of the minimum thickness. It was found that using this process, a minimum thickness of as little as 2 to 2.5 millimeters could be obtained depending upon the viscosity of the thermoplastic material.

Specifically, injection molding using heat and cool technology can involve rapidly heating the mold at a rate of 10 to 40 degree centigrade per second (° C./sec), specifically 12 to 25° C./sec to greater than or equal to the glass transition temperature of the thermoplastic material. The mold can be heated to a temperature greater than or equal to 180° C., specifically greater than or equal to 200° C. Once the mold has reached its heated mold temperature, the thermoplastic material can be injected (filled) and packed into the mold. The thermoplastic material can be injected at a temperature of greater than or equal to the melt temperature of the materials. The thermoplastic material can be injected at a temperature of greater than or equal to 350° C., specifically greater than or equal to 390° C., more specifically greater than or equal to 400° C. Subsequently, the mold is cooled (e.g., rapidly cooled such as at a rate of 5 to 20° C./sec, more specifically 10 to 12° C./sec). The mold can be cooled such that the thermoplastic material cools to a temperature of less than its ejection temperature. The thermoplastic material can then be ejected from the mold. The process can then be repeated for the production of a subsequent tray table arm.

The tray table arm can be over-molded in a two shot injection molding process, where after the first material is molded as described above, a second material can be molded over the first material. The second material can be added to enhance the geometric stiffness of the tray table arm in order to compensate for the lower stiffness of the thermoplastic as compared to metal tray table arms. Accordingly, the second material can be used to form the insert 35 as shown in FIG. 7 or can be used to fill in a reinforcing region such as reinforcing region 36. It is to be understood that the reinforcing region can take on various shapes, can be located on one or both sides of the flange, can be located in a region or along the length of the tray table arm, and in instances where at least a section of the tray table arm has a C-shaped or U-shaped cross-section, a reinforcing region can be located in between the legs. The second material can be a foam as described for the insert 35 or can be the same or different thermoplastic material as that of the support arm.

FIG. 7 illustrates a connection between the support arms 11 and the table 63, where the table attaches to pivot blocks 62 that are located at the ends of a torque rod 85. When the table 63 is rotated from a closed position to an operable position, it rotates around an axis of rotation 86. The torque rod 85 can be located at the axis of rotation 86 or can rotate around the axis of rotation 86. The stopper pins 61 likewise rotate around the axis of rotation 86. The pivot blocks 62 can connect to the support arms 11 via any attachment method. For example, a connector pin 81 located on the pivot block 62 can be inserted into the corresponding opening 80 of the support arm 11 as illustrated in FIG. 7 or the pivot blocks 62 can have an opening therein such that a connector pin 81 (see FIG. 8) that is attached to or that is a part of the support arm can be inserted.

As illustrated in FIG. 1, metal tray table arms generally have a slot 5 in the tray table end where a support pin moves during the opening/closing of the tray. A threaded screw can be located at least at one end of the slot 5 in support arm to prevent the support pin from further rotating when the tray table is in its operable position. When the aluminum is exchanged with thermoplastic materials in tray table support arms, the high forces the support pin exerts on the threaded screw are transmitted to the thermoplastic material at the edges of the threads, which can result in crack initiation and propagation. The Applicants surprisingly found that by eliminating the contact of the threaded screw with the thermoplastic material of the support arm, the stress concentration that otherwise develops at the threaded edge can be eliminated. This elimination can be accomplished by various means such as by 1) the incorporation of a grub pin in the support arm through which the treaded screw traverses, 2) the incorporation of a mounting bracket with a stop location on the support arm, or 3) the incorporation of positioner brackets for receiving the threaded screw.

Figure 6:
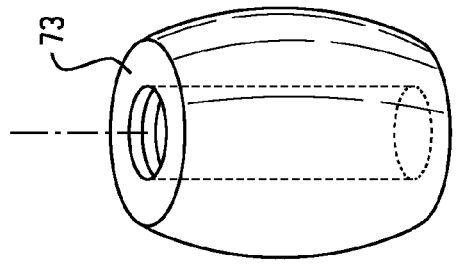
FIG. 6 is an illustration of various shaped grub pins.
Figure 6:
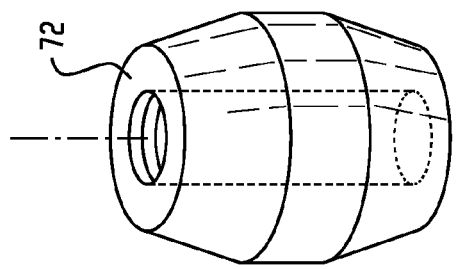
Figure 6:
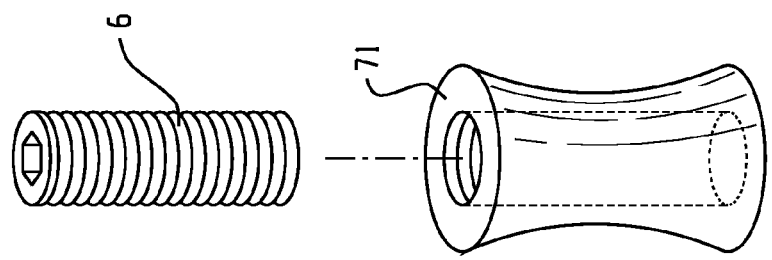

The use of a grub pin to eliminate the contact of the threaded screw with the thermoplastic material can be accomplished by positioning a grub in one or both of the stop locations for the stopper pin, where one or both of the grub pins can be insert molded into the support arm. The grub pin can have a threaded opening, through which the threaded screw can be inserted. Various grub pins are illustrated in FIG. 6. The support arm can be designed such that the grub pin traverses through the support arm in a region of increased thickness. The grub pin can be made of metal, such as aluminum.

The Applicants further found that by varying the surface of the grub pin, they could increase the amount surface area between the grub pin and the thermoplastic material, which results in an increase in slip strength between the two components. The grub pin can have a cylindrical surface or can have a varying outer diameter along the length of the grub pin. The varying diameter can result in, for example, a concave grub pin 71, a varied angle grub pin 72, or a convex grub pin 73. Likewise, the grub pin can be spherical or semi-spherical, ellipsoidal, or sections of a sphere or ellipsoid suitably flattened at one end.

The surface of the grub pin can be smooth. Likewise, in order to further increase the surface area between the grub pin and the thermoplastic material of the support arm, the surface can be textured or can have protrusions thereon. For example, the grub pin can have protrusions located radially around the circumference of the surface such that the protrusions can act to limit angular movement of the pin, resulting in an increase in the slip limit of the grub pin/thermoplastic material interface. The protrusions can run parallel to the axis of the middle portion or can be randomly located throughout the length. The protrusions can be radially located every 15 to 20 degrees around the circumference of the grub pin. Furthermore, the grub pin can have a non-circular cross-section, where it can have for example a pentagonal or a hexagonal shape that can vary along the length of the grub pin.

Figure 8:
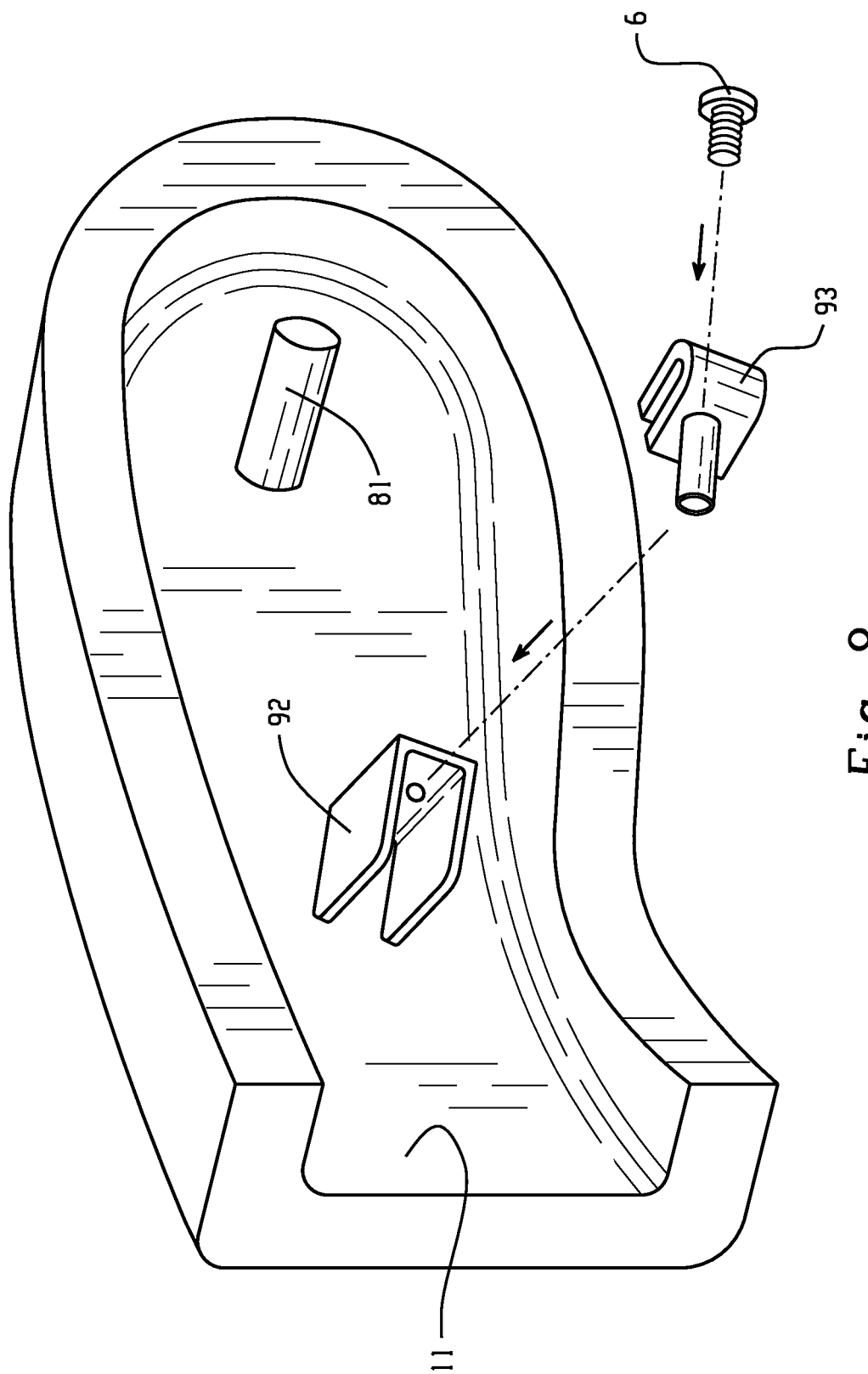
FIG. 8 is an illustration of a mounting bracket configuration for holding the tray table in the operable position.

The use of a mounting bracket with a stop position is illustrated in FIG. 8, where a mounting bracket 92 is located on the surface of a support arm 11. The mounting bracket 92 can be attached to the support arm 11 by any known means or can be molded as part of the support arm 11. The mounting bracket 92 has a hole therein to receive a threaded screw 6. In order to prevent the threads from the threaded screw 6 from contacting the mounting bracket 92, a clip nut 93 can be used such that the threaded screw 6 is in threaded contact with only the clip nut 93. The clip nut 93 can be a metallic clip nut. The mounting bracket can be located in a position on the support arm such that when the tray table is in its operable position, the threaded screw 6 is at a stop position of the stopper pin such that the threaded screw 6 stops the rotation of the tray table.

Figure 9:
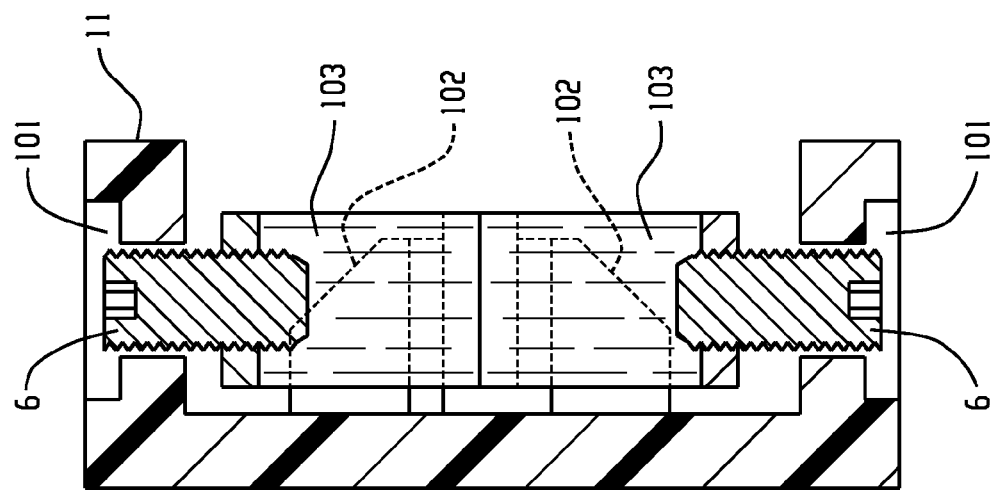
FIG. 9 is an illustration of a metallic bracket for holding the tray table in the operable position.
Figure 9:
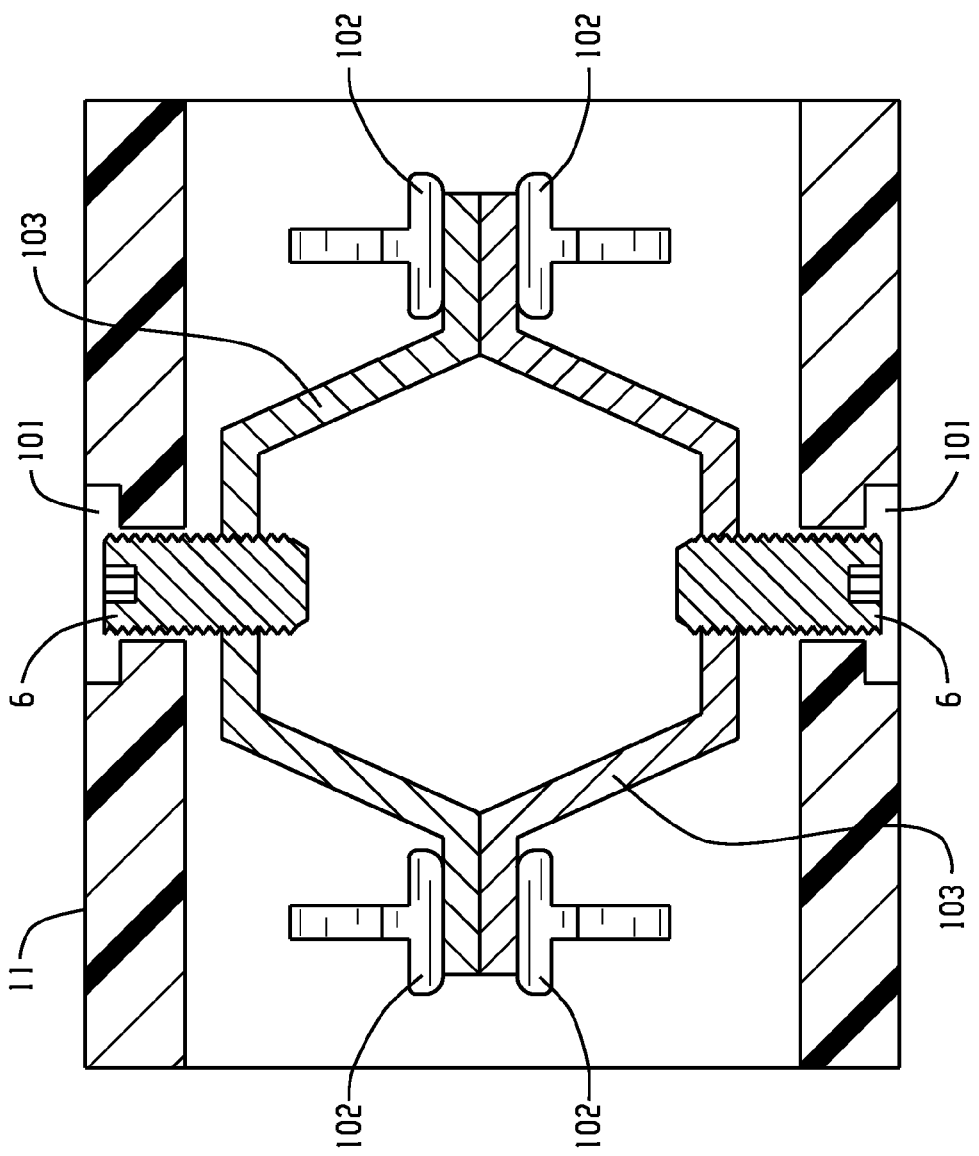
Figure 10:
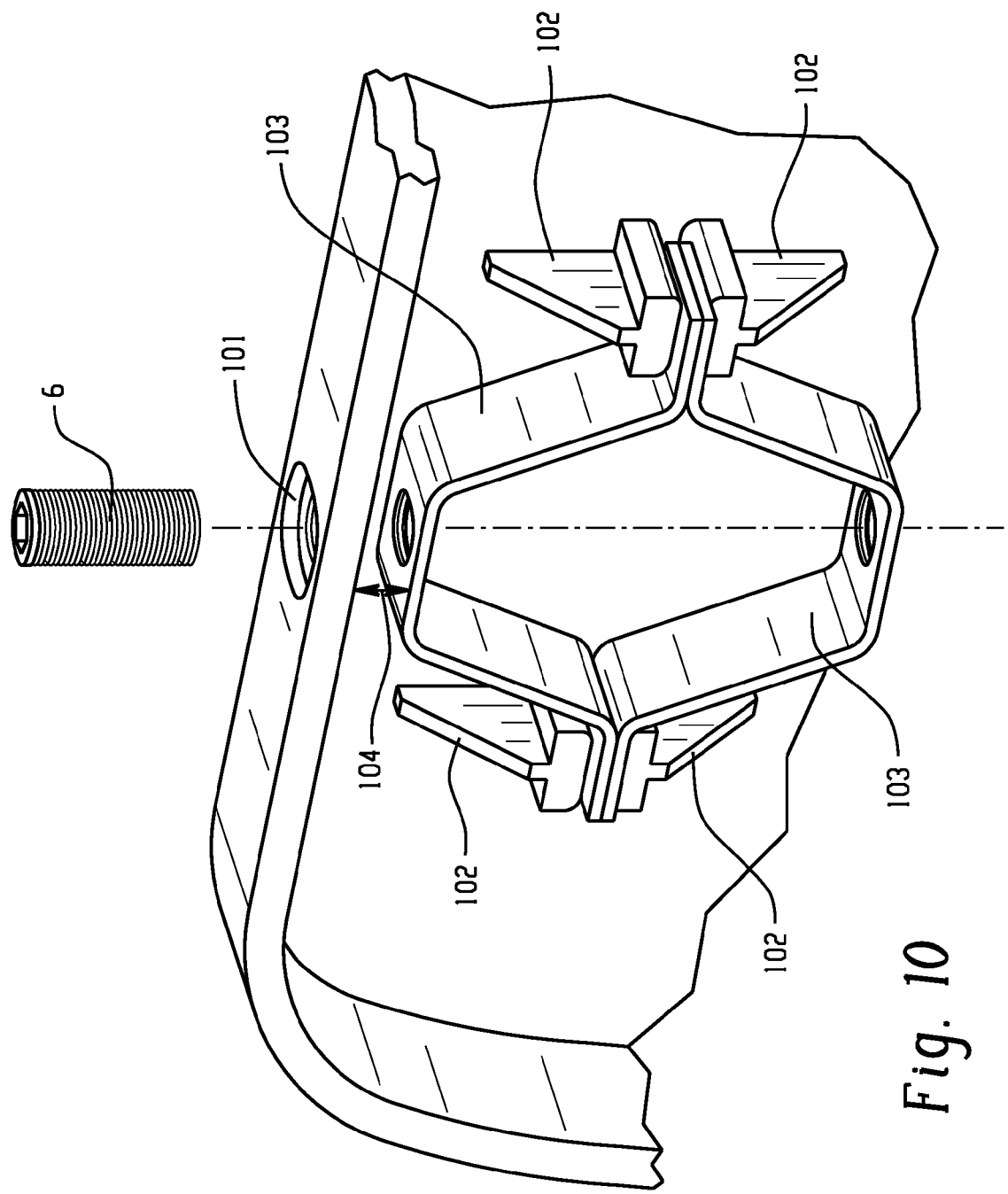
FIG. 10 is a three dimensional illustration of a metallic bracket for holding the tray table in the operable position.

The incorporation of positioner brackets for receiving threaded screws is illustrated in FIGS. 9 and 10. FIGS. 9 and 10 illustrate a support arm that has a clearance hole 101. The clearance hole 101 can be large enough such that a threaded screw 6 and/or a grub pin can be inserted there through. The threaded screw 6 and/or the grub pin can be in threaded contact with only a metal bracket 103. There can be a gap 104 between the metal bracket 103 and the edge of the support arm. One or more metal brackets can be used, where the use of two metal brackets 103 is illustrated in FIG. 9. The metal bracket 103 can be positioned on the support arm through the use of one or more of a positioner 102 located on the surface of the support arm. The positioner(s) can be attached to the support arm by any known means or can be molded as part of the support arm. When the tray table is in the operable position, the stopper pin is stopped by the threaded screw 6 and/or grub pin. The metal bracket 103 acts to split the force exerted thereon by the stopper pin such that the positioners 102 on either side of the metal bracket 103 resist the force. The positioners are suitably dimensioned such that the shear stresses induced on them to resist the vertical load, are well below the shear limit of the material.

The following examples are provided as non-limiting examples of the present disclosure.

EXAMPLES

Examples 1-12

Single Modulus Cross-Sections

Figure 11:
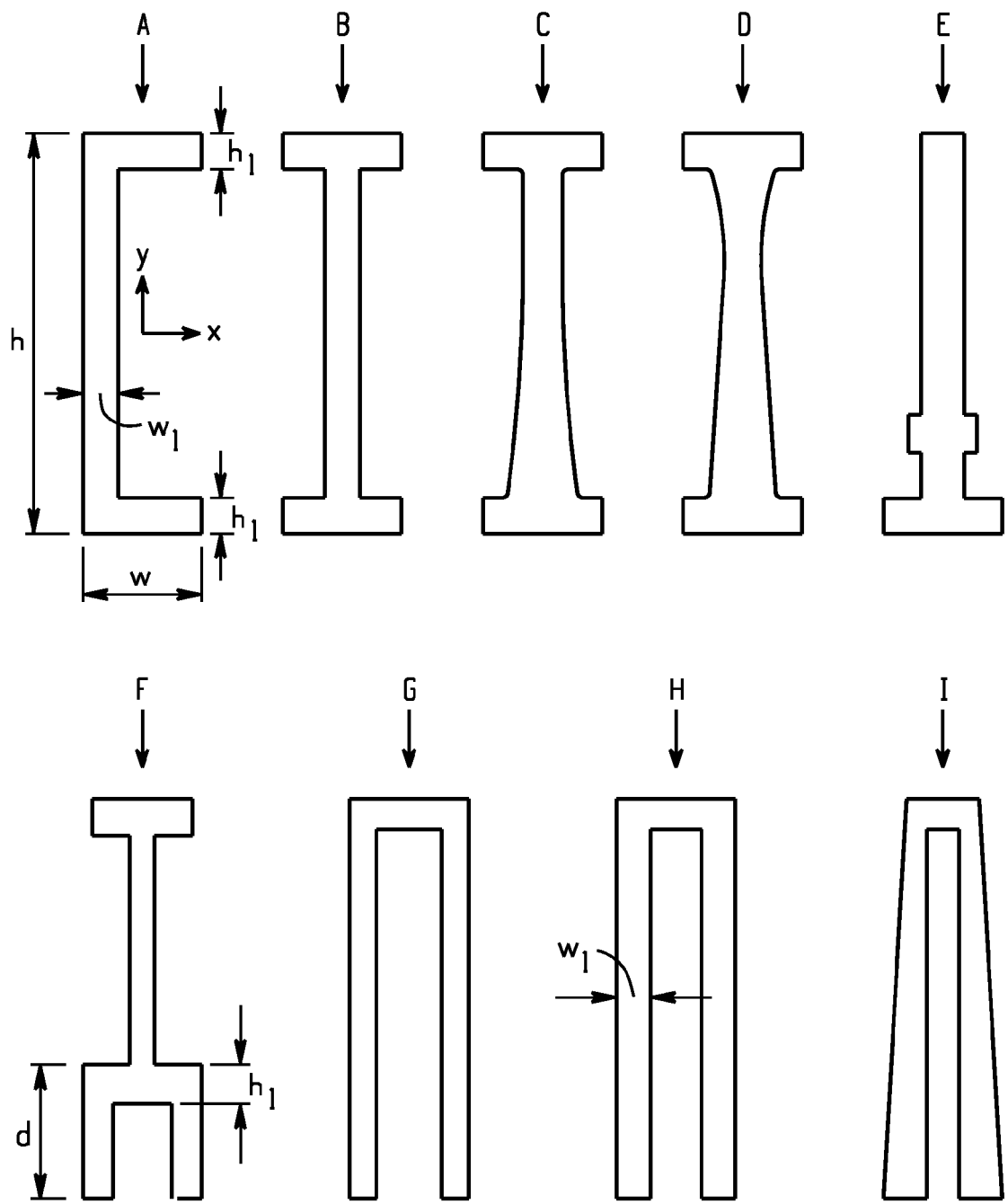
FIG. 11 is an illustration of the geometric cross-sections used in Examples 1-12.

The center of gravity, area moment of inertia, the cross section area, was determined using SOLIDWORKS 2011™ CAD software. ABAQUS V6.9™ was used for simulations, in which various cross-sectional geometries A-I as illustrated in FIG. 11 were tested for in-plane and side loading. For in-plane loading, a pure bending moment of 90180 Newton-millimeters (N-mm) was applied along the X axis (see FIG. 11) and the displacement in the y-direction, UY, of various cross-sectional geometries was determined. For side loading, a pure bending moment 4509 N-mm was applied along the Y axis (see FIG. 11) and the displacement in the X-direction, UX, of various cross-sectional geometries was determined.

Cross-section A is a C-shaped comparative cross-section; cross-section B is an I-shaped comparative cross-section; cross-sections C-E are modified I-shaped cross-sections, where the shape of the web is varied; cross-section F-d is a I/U-shaped cross-section, where d is illustrated in FIG. 11 (for example F-10.0 is the I/U-shaped cross-section F, where d is 10.0 millimeters (mm)); and cross-sections G-I are U-shaped cross-sections, where the thickness of the legs is increased from cross-section G to cross-section H and the shape of cross-section I is flat-pyramidal. Specifically, for cross-sections A-E, G, and H, the height, h, was 30 mm and the width, w, was 9.5 mm. The top and bottom widths of cross-sections I were 8 and 12 mm, respectively, and the top and bottom widths of cross-sections F were 9.5 and 12 mm, respectively. The width of the web, $w_1$, of cross-sections A and F were 3 and 2.5 mm, respectively, and the width, $w_1$, of the two webs of cross-sections G and H were 2 and 3 mm, respectively. The width, $w_1$, at the top and bottom of the two webs of cross-sections I were 2 and 5 mm, respectively. The height, $h_1$, for all cross-sections was 3 mm.

Two different values for the specific gravity of the material were used, of 2.5 and 1.44 to represent aluminum and a thermoplastic material, respectively. The center of gravity was determined for each of the different cross-sectional geometries A-I based on a respective geometric center point as illustrated in cross-section A of FIG. 11 by a position 0,0 of the x-y axis. A mass for each of the cross-sectional geometries A-I was determined from solidworks. The area moment of inertia in the xx, yy, and zz directions were also determined from solidworks, where the area moment of inertia, also known as "moment of inertia of plane area", "the second moment of area", or "second area moment", is a property of a cross-section that can be used to predict the resistance of a beam to bending and deflection around an axis that lies in the cross-sectional plane and is an indicator of geometric stiffness of that cross-section. The stress in, and deflection of, a beam under load depends not only on the load but also on the geometry of the beam's cross-section: larger values of second moment cause smaller values of stress and deflection. Jxx represents area moment of inertia of a cross section about the X-X axis and Jyy represents area moment of inertia of a cross section about the Y-Y axis. The results are shown in Table 1.

TABLE 1

| | Example | | | | | |
|---|---|---|---|---|---|---|
| | CE-1 | CE-2 | CE-3 | 4 | 5 | 6 |
| Cross-section | A | A | B | C | D | E |
| Specific Gravity | 2.5 | 1.44 | 1.44 | 1.44 | 1.44 | 1.44 |
| Mass (g) | 69.5 | 39.1 | 39.0 | 40.0 | 44.3 | 45.4 |
| Cross-sectional Area (mm$^2$) | 129 | 129 | 129 | 142 | 147 | 150 |
| Center of Gravity (mm) | | | | | | |
| x-direction | −1.81 | −1.81 | 0 | 0 | 0 | 0 |
| y-direction | 0 | 0 | 0 | −0.7 | 1.7 | −2.5 |
| area moment of inertia (J) (mm$^4$) | | | | | | |
| xx-direction | 13887 | 13887 | 13887 | 14676 | 15201 | 12826 |
| yy-direction | 819 | 819 | 483 | 526 | 541 | 614 |
| zz-direction | 14706 | 14706 | 14370 | 15203 | 15742 | 13440 |
| In plane loading | | | | | | |
| UY (mm) | — | 3.70 | 3.70 | — | 3.38 | — |
| Tensile (MPa) | — | 134.8 | 132.5 | — | 125.1 | — |
| Compressive (MPa) | — | 133.2 | 131.4 | — | 118.1 | — |
| Side loading | | | | | | |
| UX (mm) | — | 3.13 | 3.12 | — | 4.49 | — |
| Tensile (MPa) | — | 18.3 | 18.4 | — | 41.9 | — |
| Compressive (MPa) | — | 41.4 | 41.4 | — | 41.7 | — |

| | Example | | | | | |
|---|---|---|---|---|---|---|
| | 7 | 8 | 9 | 10 | 11 | 12 |
| Cross-section | F-10.0 | F-7.5 | F-5.0 | G | H | I |
| Specific Gravity | 1.44 | 1.44 | 1.44 | 1.44 | 1.44 | 1.44 |
| Mass (g) | 45.1 | 42.1 | 39.8 | 41.3 | 57.6 | 58.1 |
| Cross-sectional Area (mm$^2$) | 149 | 140 | 132 | 137 | 191 | 192 |

TABLE 1-continued

|  | Center of Gravity (mm) | | | | | |
| --- | --- | --- | --- | --- | --- | --- |
| x-direction | 0 | 0 | 0 | 0 | 0 | 0 |
| y-direction | −1.2 | −1.2 | −1.1 | 1.6 | 0.7 | −0.7 |
| area moment of inertia (J) (mm$^4$) | | | | | | |
| xx-direction | 13808 | 14169 | 14479 | 11656 | 15316 | 15597 |
| yy-direction | 1551 | 1238 | 927 | 1769 | 2047 | 2456 |
| zz-direction | 15358 | 15408 | 15405 | 13425 | 17363 | 18052 |
| In plane loading | | | | | | |
| UY (mm) | 3.73 | — | 3.55 | — | — | — |
| Tensile (MPa) | 137.3 | — | 128.7 | — | — | — |
| Compressive (MPa) | 107.4 | — | 114.4 | — | — | — |
| Side loading | | | | | | |
| UX (mm) | 1.57 | — | 2.63 | — | — | — |
| Tensile (MPa) | 19.4 | — | 32.3 | — | — | — |
| Compressive (MPa) | 19.4 | — | 32.2 | — | — | — |

As expected, Table 1 shows that the center of gravity in the x-direction for all of the cross-sections of B-I is 0 due to their symmetry around the y-axis and that the center of gravity in the x-direction for cross-section A has a negative value of −1.81 mm due to the web portion being located to the left of the axis, resulting in an asymmetry about the y-axis. Furthermore, cross-sections A and B have a center of gravity in the y-direction of 0 due to their respective symmetries about the x-axis, while the center of gravity in the y-direction for cross-sections C-I varies according to where the bulk of the material in the respective cross-sections is located.

Table 1 shows that cross-section B had the same area moment of inertia in the xx-direction as the C-shaped cross-section A. It was surprisingly found that while the area moment of inertia in the xx-direction of the I-shaped cross-section could be increased by adding mass to the web portion, as shown in modified I-shaped cross-sections C and D. Similarly, U-shaped cross-sections H and I also show that adding mass to the leg portions of the U-shape results in an increase in the area moment of inertia in the xx-direction.

Table 1 further shows that a significant increase in the area moment of inertia in the yy-direction relative to the C-shaped cross-section A was achieved in the I/U-shaped cross-section F and in the U-shaped cross-sections G-I, showing that these geometries can better resist side loading than the C-shaped cross-section A. For instances where the tray table is subjected to both high in-plane loadings and high side loading a I/U-shaped cross-section F or a U-shaped cross-sections may therefore be preferable as they were shown to be capable of achieving from almost twice the area moment of inertia in the yy-direction as is observed in cross-section F to almost three times the area moment of inertia in the yy-direction as is observed in cross-section I as compared to that of the C-shaped cross-section A. The I/U-shaped cross-section may be preferable to the U-shaped cross-section in instances where the greatest amount of weight reduction in combination with improved area moment of inertia in the xx and yy-directions is desirable as U-shaped cross-sections H and I were shown to have an increased mass as compared to the I/U shaped cross-section F.

Examples 13-14

Bi-Modular, Straight Arm Cross-Sections

Figure 13:
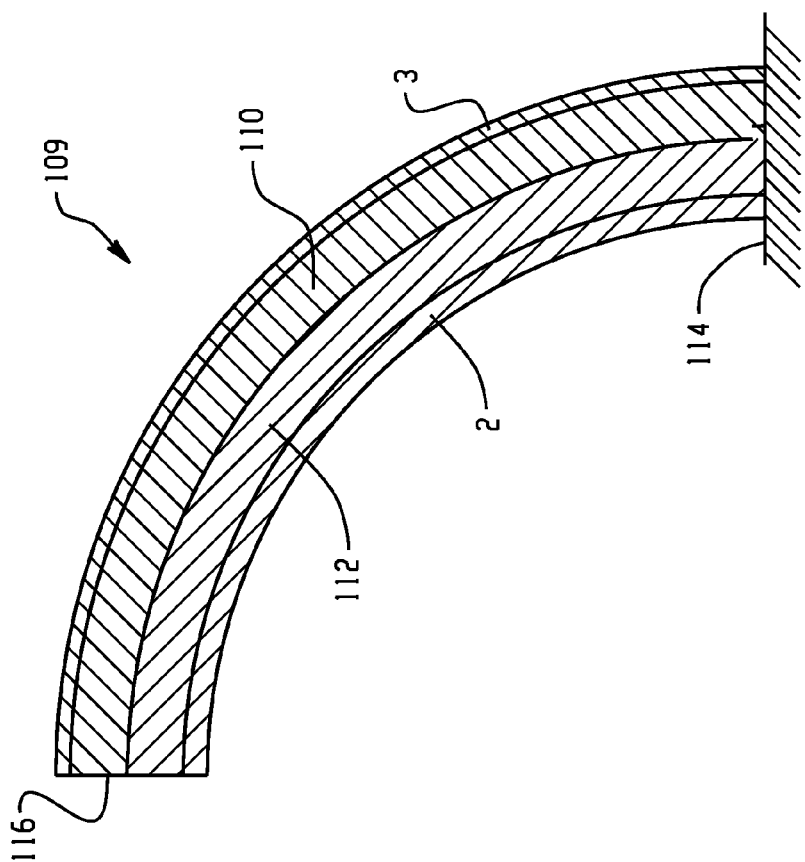
FIG. 13 is an illustration of the bi-modular support arm used in Examples 15-18.
Figure 12:
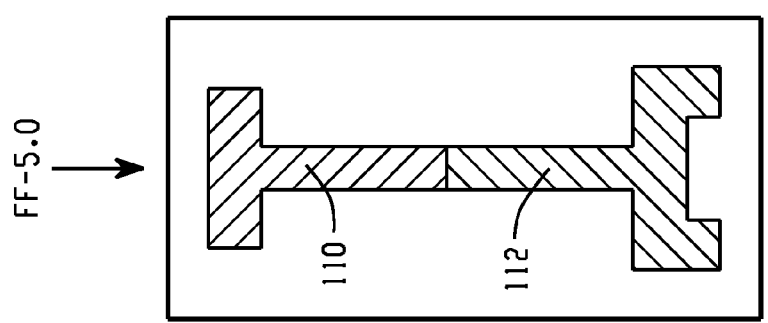
FIG. 12 is an illustration of the bi-modular cross-sections used in Examples 13-18.

The center of gravity, area moment of inertia, and in-plane loadings of two bi-modular support arms were determined as was described in Example 1. In the simulations, straight arms with bi-modular cross-sectional geometries AA and FF-5.0, Comparative Example 13 and Example 14, respectively, as illustrated in FIG. 12 were tested. Specifically, FIGS. 12 and 13 show that the bi-modular cross-sectional geometries AA and FF-5.0 have a high modulus region 110 located proximal to the outer edge 3 and a low modulus region 112 is located proximal to the inner edge 2, where the high modulus region 110 has a tensile modulus of 38.6 GPa and the low modulus region 112 has a compressive modulus of 30.0 GPa. The specific gravity was kept constant at 1.44. The results are shown in Table 2.

TABLE 2

|  | Example | | | | | |
| --- | --- | --- | --- | --- | --- | --- |
|  | CE-13 | 14 | CE-15 | 16 | CE-17 | 18 |
| Cross-section | AA | FF-5.0 | AA | FF-5.0 | AA | FF-5.0 |
| Mass (g) | 39.1 | 39.8 | 36.5 | 36.9 | 36.5 | 36.9 |
| Geometry | straight bi-modular | straight bi-modular | bent Single modular | bent Single modular | bent bi-modular | bent bi-modular |
| Cross-sectional Area (mm$^2$) | 129 | 132 | 129 | 132 | 129 | 135 |
| Center of Gravity (mm) | | | | | | |
| x-direction | −1.8 | 0 | −1.8 | 0 | −1.8 | 0 |
| y-direction | 0 | −1.1 | 0 | −1.1 | 0 | −1.1 |

TABLE 2-continued

| | CE-13 | 14 | CE-15 | 16 | CE-17 | 18 |
|---|---|---|---|---|---|---|
| Area Modulus (mm⁴) | | | | | | |
| xx-direction | 13887 | 14479 | 13887 | 14479 | 13887 | 14479 |
| yy-direction | 819 | 927 | 819 | 927 | 819 | 927 |
| zz-direction | 14706 | 15405 | 14706 | 15405 | 14706 | 15405 |
| In plane loading | | | | | | |
| UY (mm) | 4.2 | 4.0 | — | — | — | — |
| Tensile (MPa) | 132.1 | 125.3 | — | — | — | — |
| Compressive (MPa) | 123.5 | 105.9 | — | — | — | — |
| Load edge face, In plane load | | | | | | |
| UZ (mm) | — | — | 2.8 | 2.6 | 3.2 | 2.9 |
| Tensile (MPa) | — | — | 124.4 | 113.5 | 130.4 | 116.4 |
| Compressive (MPa) | — | — | 137.5 | 92.3 | 129.4 | 89.1 |
| Fixed edge face, In plane load | | | | | | |
| Tensile (MPa) | — | — | 125.2 | 114.2 | 132.1 | 117.1 |
| Compressive (MPa) | — | — | 138.9 | 91.5 | 130.9 | 88.2 |

A comparison of Tables 1 and 2 shows that as the modulus of the side under compression decreases, the overall effectiveness of the support arm with the I/U-shaped cross-section increases as compared to C cross-section. Specifically, the bi-modular, cross-sections of Comparative Example 13 and Example 14 show improvements in the tensile and compressive stresses relative to the single modular cross-sections of Comparative Example 2 and Example 9, respectively.

Examples 15-18

Single Modulus and Bi-Modular Bent Support Arms

The center of gravity, area moment of inertia, and in-plane loadings of two bent, single modular support arms with a modulus of 38 GPa (Comparative Example 15 and Example 16) and two bent, bi-modular support arms (Comparative Example 17 and Example 18, see FIGS. 12 and 13) were determined as was described in Example 1. The two bi-modular support arms had a high modulus region 110 located proximal to the outer edge 3 and a low modulus region 112 is located proximal to the inner edge 2, where the high modulus region 110 has a tensile modulus of 38.6 GPa and the low modulus region 112 has a compressive modulus of 30.0 GPa. Comparative Examples 15 and 17 had a cross-section AA and Examples 16 and 18 had a cross-section FF-5.0. The specific gravity was kept constant at 1.44. The simulations were performed with a pure moment of 90180 N-mm as external load, on the leading edge 116 of the support arm, where the other end of the support arm is a fixed edge 114. The results are shown in Table 2.

Table 2 shows that the tensile and compressive stresses are reduced in single modular support arms with a I/U shaped cross-section (Examples 16 and 18) relative to those having a C-shaped cross-section (Comparative Examples 15 and 17, respectively). Table 2 further shows that the bi-modular support arms of Comparative Example 17 and Example 18 showed an improvement in the compressive stresses relative to the corresponding single modular support arms of Comparative Example 15 and Example 16, respectively. Example 18 resulted in reduced tensile and compressive stresses as compared to the bi-modular C-shaped cross-section of Comparative Example 17.

Set forth below are some embodiments of the tray table arm and methods for the same.

Embodiment 1 a support arm comprising: a thermoplastic material and a filler. A cross-section of the support arm taken along a line from an inner edge to an outer edge of the support arm comprises a modified I-shaped, a I/U-shaped, or a U-shaped cross-section.

Embodiment 2 the support arm of Embodiment 1, wherein the filler comprises a fiber filler.

Embodiment 3 the support arm of Embodiment 2, wherein the fiber filler comprises a glass fiber or a carbon fiber.

Embodiment 4 the support arm of any of Embodiments 1-3, further comprising an insert located in an inner flange and/or in part of the web.

Embodiment 5 the support arm of Embodiment 4, wherein the insert is located along the length of the inner edge.

Embodiment 6 the support arm of any of Embodiments 4-5, wherein the insert is located in one or both of a high stress region and a low stress region.

Embodiment 7 the support arm of Embodiment 6, wherein the insert is located in the high stress region and comprises a metal.

Embodiment 8 the support arm of any of Embodiments 6-7, wherein the insert is located in the low stress region and comprises a void space or a foam.

Embodiment 9 the support arm of any of Embodiments 1-8, wherein a distance between the inner edge and the outer edge is not constant.

Embodiment 10 the support arm of any of Embodiments 1-9, further comprising a reinforcing rib.

Embodiment 11 the support arm of Embodiment 10, wherein the reinforcing rib is radially located relative to a local center of curvature perpendicular to the arm and wherein the center of curvature is determined based on the location on the support arm.

Embodiment 12 the support arm of Embodiment 1, further comprising a C-shaped cross-section.

Embodiment 13 a method of preparing a support arm comprising: rapidly heating a mold to a glass transition temperature of a thermoplastic material; injecting a thermoplastic material comprising a filler into the mold and allowing the thermoplastic material to conform to the mold; rapidly cooling the mold to an ejection temperature to form the tray table arm; and ejecting the support arm. A cross-section of the support arm taken along a line from an inner edge to an outer edge of the support arm is a modified I-shaped, a I/U-shaped, or a U-shaped cross-section.

Embodiment 14 a tray table comprising: a support arm comprising a thermoplastic material and a filler, wherein a cross-section of the support arm taken along a line from an inner edge to an outer edge of the support arm comprises a modified I-shaped, a I/U-shaped, or a U-shaped cross-section; a torque rod; a pivot block; a stopper pin; a table; and a means for keeping the tray table in the operable position.

Embodiment 15 the tray table of Embodiment 14, wherein the means for keeping the tray table in the operable position comprises: a grub pin that traverses through the support arm. The grub pin prevents the further rotational motion of the stopper pin when the tray table is in the operable position.

Embodiment 16 the tray table of Embodiment 15, wherein the grub pin has a cylindrical, a convex, a concave, or an angled surface.

Embodiment 17 the tray table of any of Embodiments 15-16, wherein the grub pin has a textured surface.

Embodiment 18 the tray table of any of Embodiments 15-17, wherein a threaded screw is in threaded contact within the grub pin.

Embodiment 19 the tray table of Embodiment 14, wherein the means for keeping the tray table in the operable position comprises: a mounting bracket attached to the support arm, a clip nut attached to the mounting bracket, and a threaded screw that is in threaded contact within the clip nut. The threaded screw prevents the further rotational motion of the stopper pin when the tray table is in the operable position.

Embodiment 20 the tray table of Embodiment 14, wherein the means for keeping the tray table in the operable position comprises: a clearance hole located in the support arm, a threaded screw that traverses through the clearance hole, a metal bracket that is in threaded contact with the threaded screw, and a positioner. The threaded screw prevents the further rotational motion of the stopper pin when the tray table is in the operable position.

Embodiment 21 the tray table of any of Embodiments 14-20, wherein the pivot block connects the torque rod to the support arm, and wherein the stopper pin is located on the pivot block.

Embodiment 22 the tray table of Embodiment 21, further comprising an attachment that is located on the support arm, and a connector pin, wherein the connector pin is attached to the support arm via the attachment, wherein the connector pin is inserted into an opening in the pivot block.

Embodiment 23 the tray table of any of Embodiments 21-22, wherein the pivot block comprises a connector pin, wherein the connector pin is inserted into a hole in the support arm.

Embodiment 24 the tray table of any of Embodiments 21-23, wherein the table is connected to the pivot block.

The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A support arm comprising:
    a thermoplastic material; and
    a filler;
    wherein a cross-section of the support arm taken along a line from an inner edge to an outer edge of the support arm comprises a modified I-shaped, a I/U-shaped, or a U-shaped cross-section.
2. The support arm of claim 1, wherein the filler comprises a fiber filler.
3. The support arm of claim 2, wherein the fiber filler comprises a glass fiber or a carbon fiber.
4. The support arm of claim 1, further comprising an insert located in an inner flange and/or in part of a web.
5. The support arm of claim 4, wherein the insert is located along the length of the inner edge.
6. The support arm of claim 4, wherein the insert is located in one or both of a high stress region and a low stress region.
7. The support arm of claim 6, wherein the insert is located in the high stress region and comprises a metal.
8. The support arm of claim 6, wherein the insert is located in the low stress region and comprises a void space or a foam.
9. The support arm of claim 1, wherein a distance between the inner edge and the outer edge is not constant.
10. The support arm of claim 1, further comprising a reinforcing rib.
11. The support arm of claim 10, wherein the reinforcing rib is radially located relative to a local center of curvature perpendicular to the arm and wherein the center of curvature is determined based on the location on the support arm.
12. The support arm of claim 1, further comprising a C-shaped cross-section.
13. A method of preparing a support arm comprising:
    rapidly heating a mold to a glass transition temperature of a thermoplastic material;
    injecting a thermoplastic material comprising a filler into the mold and allowing the thermoplastic material to conform to the mold;
    rapidly cooling the mold to an ejection temperature to form the tray table arm; and
    ejecting the support arm,
    wherein a cross-section of the support arm taken along a line from an inner edge to an outer edge of the support arm is a modified I-shaped, a I/U-shaped, or a U-shaped cross-section.
14. A tray table comprising:
    a support arm comprising a thermoplastic material and a filler, wherein a cross-section of the support arm taken along a line from an inner edge to an outer edge of the support arm comprises a modified I-shaped, a I/U-shaped, or a U-shaped cross-section;
    a torque rod;
    a pivot block;
    a stopper pin;
    a table; and
    a means for keeping the tray table in the operable position.
15. The tray table of claim 14, wherein the means for keeping the tray table in the operable position comprises:
    a grub pin that traverses through the support arm;
    wherein the grub pin prevents the further rotational motion of the stopper pin when the tray table is in the operable position.
16. The tray table of claim 15, wherein the grub pin has a cylindrical, a convex, a concave, or an angled surface.
17. The tray table of claim 15, wherein the grub pin has a textured surface.
18. The tray table of claim 15, wherein a threaded screw is in threaded contact within the grub pin.
19. The tray table of claim 14, wherein the means for keeping the tray table in the operable position comprises:
    a mounting bracket attached to the support arm,
    a clip nut attached to the mounting bracket, and
    a threaded screw that is in threaded contact within the clip nut;
    wherein the threaded screw prevents the further rotational motion of the stopper pin when the tray table is in the operable position.
20. The tray table of claim 14, wherein the means for keeping the tray table in the operable position comprises:
    a clearance hole located in the support arm,
    a threaded screw that traverses through the clearance hole,
    a metal bracket that is in threaded contact with the threaded screw, and
    a positioner;
    wherein the threaded screw prevents the further rotational motion of the stopper pin when the tray table is in the operable position.
21. The tray table of claim 14, wherein the pivot block connects the torque rod to the support arm, and wherein the stopper pin is located on the pivot block.
22. The tray table of claim 21, further comprising an attachment that is located on the support arm, and a connector pin, wherein the connector pin is attached to the support arm via the attachment, wherein the connector pin is inserted into an opening in the pivot block.
23. The tray table of claim 21, wherein the pivot block comprises a connector pin, wherein the connector pin is inserted into a hole in the support arm.
24. The tray table of claim 21, wherein the table is connected to the pivot block.

* * * * *